Patented June 22, 1926.

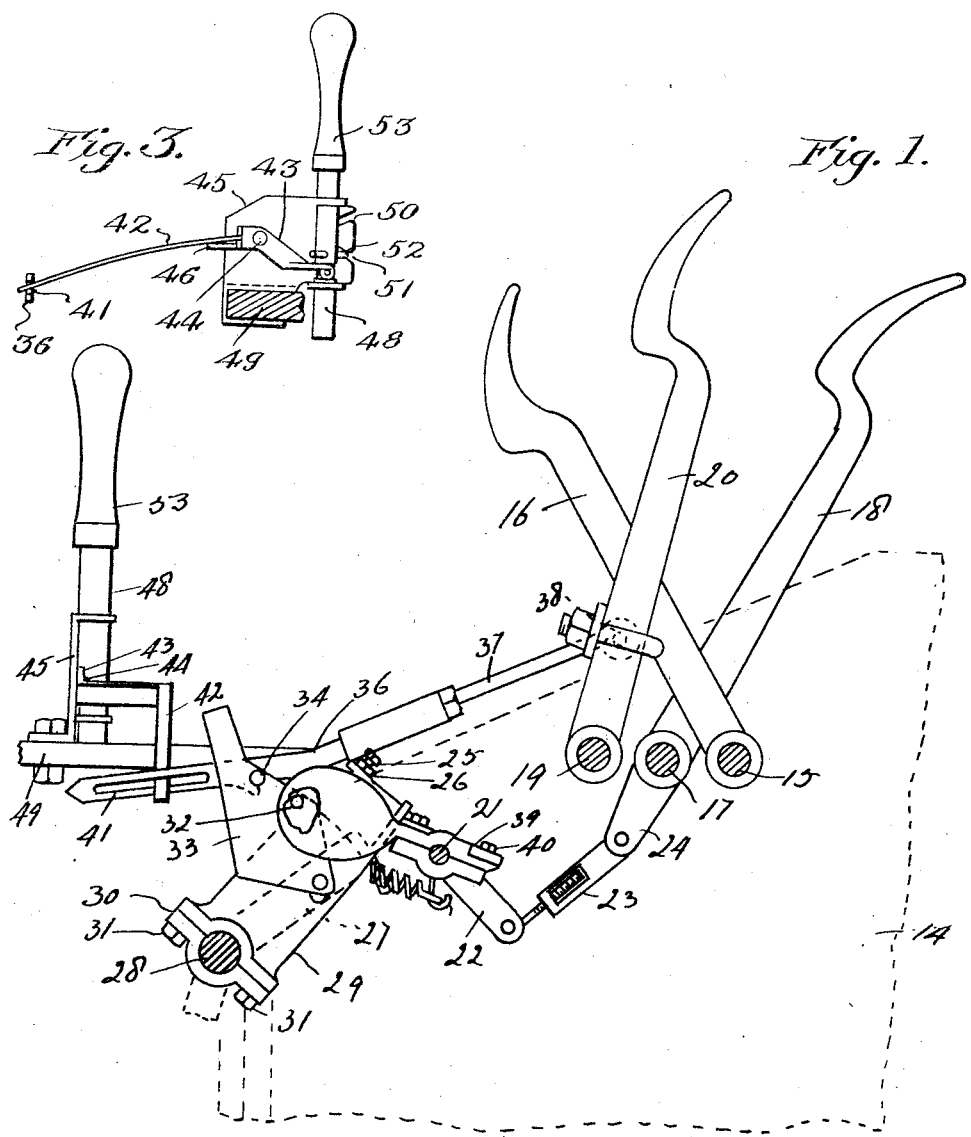

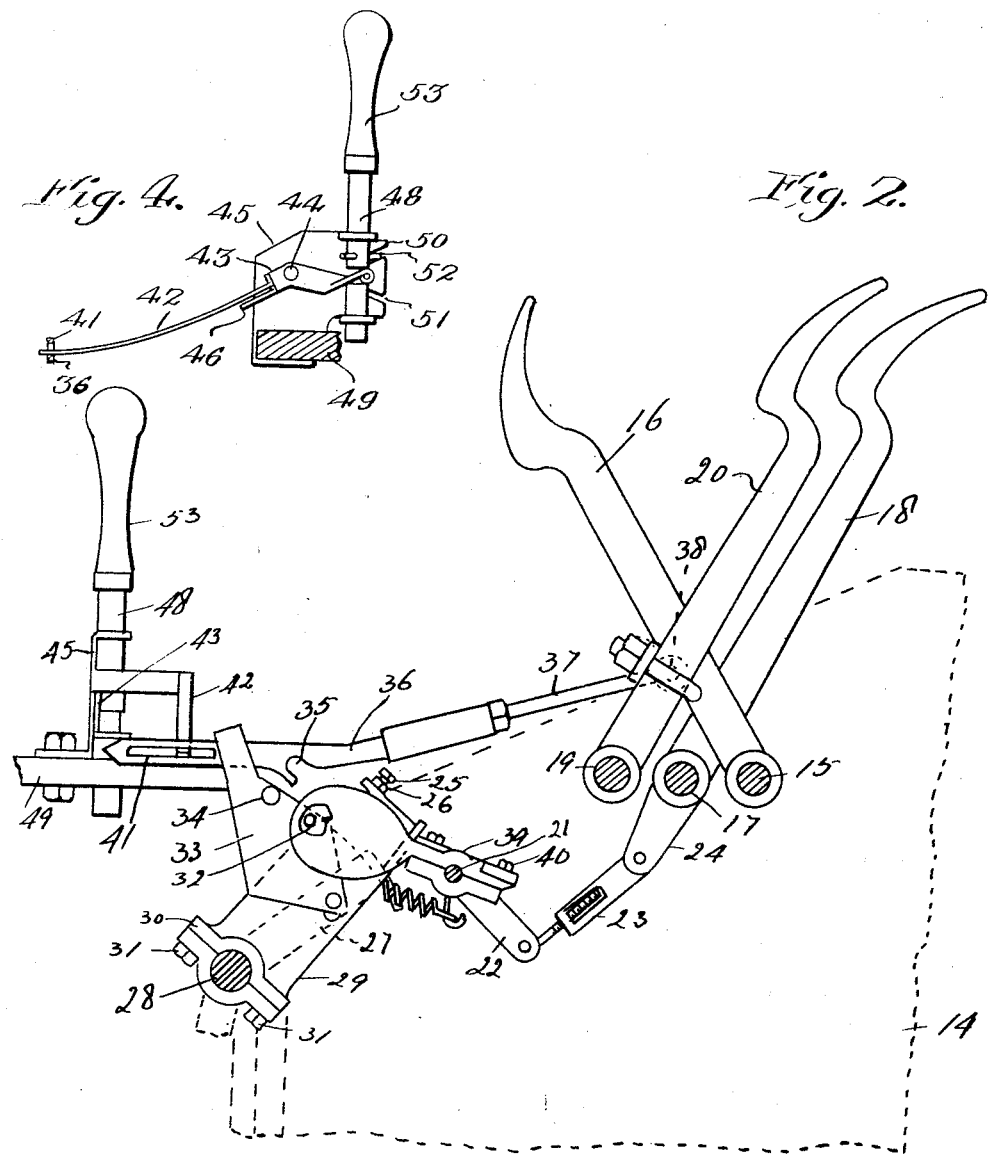

1,589,473

UNITED STATES PATENT OFFICE.

OTTO KUGLER, SR., OF PHILADELPHIA, PENNSYLVANIA.

SAFETY DEVICE FOR AUTOMOBILE CLUTCH CONTROLLERS.

Application filed May 23, 1924. Serial No. 715,288.

My invention relates to new and useful improvements in a safety device for automobile clutch controllers, and more particularly to improvements on my Patent No. 1,544,324 dated June 30, 1925 for safety clutch controller for automobiles, and has for its primary object the provision of means to disengage the connector between the brake pedal and link plate whereby the brake may be actuated without operating the controller.

Another object of this invention is to so construct the safety device that it will have resilient action in two opposite directions according to the position in which it is set.

In the clutch controller embodied in the co-pending application above mentioned the clutch is disengaged when making an application of the brake which is undesirable, especially when descending a steep grade. By keeping the clutch engaged the engine will provide a "drag" when the speed of the automobile exceeds that of the engine. The provision of my safety device will permit the use of the brake without disengaging the clutch thus giving the operator the advantage of the engine drag in conjunction with his brakes.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is an inner side elevation of the safety clutch controller mechanism as though looking through the transmission case, which is illustrated in dotted lines, from the side opposite the pedals, with the safety device associated therewith and showing the parts in one position with the brake pedal and link plate connected for simultaneous movement.

Fig. 2, is a similar view showing the connector disengaged from the link plate by the safety device to permit of the brake pedal without actuating the controller mechanism.

Fig. 3, is a front face view of the safety device showing it in the position for lifting the connecting clevis.

Fig. 4, is a similar view showing the device in the position for depressing the connecting clevis.

Fig. 5, is an edge or plan view of the spring arm actuating lever.

In carrying out my invention as herein embodied, an automobile transmission casing is shown in dotted lines and indicated by the numeral 14. Associated with this casing for actuating the various elements of the transmission are a number of shafts and pedals including a reverse pedal shaft 15 with a reverse pedal 16 fixed thereto, a slow speed shaft 17 with a clutch pedal 18 fixed thereto, a brake pedal shaft 19 with a brake pedal 20 fixed thereto and a clutch lever shaft 21 with a clutch lever 22 fixed thereto. To one end of the clutch lever 22 is attached a suitable connection 23 which is also attached to the free end of the pendant 24 forming a part of the clutch pedal 18. The other end of the clutch lever 22 carries an adjusting screw 25 which is held in different positions by a check nut 26. This adjusting screw coacts with the speed lever 27 fixed to the ordinary controller shaft 28 which latter actuates the emergency brakes. The parts so far referred to relate to the well known "Ford" transmission of the planetary type and therefore have not been described in detail.

On the controller shaft 28 is loosely journalled a cam plate 29 having a split bearing 30 the parts of which are held in place by suitable fastening devices 31 such as stud bolts.

The outer or free end of the cam plate forms a cam surface for coaction with a trunnion 32 passing through the link plate 33 which is oscillatingly and slidably connected with the cam plate.

Adjacent the upper or outer free end of the link plate is a pin 34, or equivalent means, with which is adapted to register the notch 35 in the lower edge of the clevis 36 having threaded connection with a rod 37 for adjustability, the latter being pivotally connected at its outer end with a suitable clamp 38 detachably fastened to the brake pedal 20.

A supplementary or secondary clutch lever 39 is suitably journalled upon the clutch lever shaft 21 beside the primary or usual clutch lever 22 and one end of said secondary clutch lever is pivoted to the link plate 33 by means of the aforementioned trunnion 32 carried by the secondary clutch lever 39. At the outer or free end of the secondary clutch lever is located a set screw 40 which impinges on the upper edge of the primary clutch lever 22 in order that the secondary clutch lever 39 may be adjusted relative to the primary clutch lever.

The above description of the safety clutch controller relates to a device substantially the same as the one described in my copending application hereinbefore referred to and when the notch 35 is in registration with the pin 34 the operation is identical and therefore a detailed description of the construction and operation will not be entered into. In starting the car the clutch pedal is actuated in the ordinary manner but after this it is unnecessary to use the clutch pedal during ordinary operation of the automobile and the brake may be applied without danger of the engine being started even though said clutch pedal is not touched this is due to the fact that as the brake pedal is moved forward, as when for a slight application of the brakes, the trunnion 32 will be caused to ride over the cam surface of the cam plate 29 thus extending the link plate relative to the cam plate causing the secondary clutch lever 39 to be tilted because of its pivotal connection with the link pedal, and through the medium of the set screw 40 will actuate the main or primary clutch lever 22. The operation of the primary clutch lever 22 will actuate the clutch lever 21 so as to shift the parts to a neutral position and disengage the clutch without actually applying the brakes but if desired the brake pedal may be forced forwardly sufficient to make a complete application of the brakes.

From this it will be seen that each time the brake pedal is actuated the clutch is disengaged which overcomes the disadvantage of having to first actuate the clutch pedal for releasing the clutch and to then actuate the brake pedal with the other foot.

Under some conditions it is undesirable to release or disengage the clutch member during an application of the brakes, as for instance, when descending a deep grade for at such a time the drag of the engine in conjunction with the brakes can be used in keeping the automobile under control, therefore in order to utilize this engine drag I have provided means for disengaging the clevis from the pin 34 on the link plate in order that said link plate will not be actuated when the brake pedal is operated.

In order to disengage the clevis 36 from the pin 34 I provide said clevis with a slot 41 through which projects the outer free end of a spring arm 42 carried by a lever 43 which is pivoted as at 44 to a suitable bracket 45. At the end of the lever 43 to which the arm 42 is connected is a finger 46 which underlies the arm 42 so as to practically shorten the working portion of the arm or stiffen the same when in its raised position, as shown in Fig. 3, while the other end of the lever 43 is bifurcated or forked as at 47 for registration with the reduced portion of the operating rod 48, said reduced portion being provided by forming a circumferential groove intermediate the ends of the operating rod which latter is suitably journalled and slidably mounted in portions of the bracket 45. The bracket 45 is fastened in any suitable manner to a desirable portion of the automobile frame designated by the numeral 49 and said bracket is further provided with two spaced notches 50 and 51 with either of which may register a pin 52 carried by the operating rod. Said operating rod is provided with any suitable handle 53.

When it is necessary or desirable to retain the connecting clevis 36 in workable engagement with the link plate 33, or in other words retain the notch 35 of the clevis in registration with the pin 34, the operating rod 48 is raised to the position shown in Figs. 1 and 4 where it may be maintained by insertion of the pin 52 in the slot 50 which is accomplished by rotating the operating rod 48 through the medium of this handle. In this position the resilient arm 42 is bowed downward so that a spring tension is always maintained on the connecting clevis.

To disconnect the clevis 36 from the link plate 33, or disengage the notch 35 from the pin 34, the operating rod 48 is rotated to withdraw the pin 52 from the slot 50 and then said operating rod is moved downward. This will actuate the lever 43 and lift the arm 42 thereby raising the clevis 36 to the position shown in Figs. 2 and 3.

After the connecting clevis 36 has been disengaged from the pin 34 so as to operate independently of the link plate 33 the brakes may be applied without affecting the clutch controller mechanism and therefore the clutch will remain in engagement so that as the automobile exceeds the speed of the engine, said engine will provide a drag on the transmission thereby assisting in keeping the automobile under control.

Of course I do not wish to be limited to the exact details of construction as herein shown as these may be varied within the limits of the appended claims without departing from the spirit of my invention.

Having thus fully described my invention, what I claim as new and useful is:—

1. The combination with an automobile clutch controller including the usual pedals of an automobile transmission and a link plate, the latter provided with a pin, of a connecting clevis having one end pivotally connected with a brake pedal for movement therewith and further having means adjacent the other end for temporary engagement with the pin on the link plate whereby said parts will move in unison and means to lift the connecting clevis to disengage it from a pin for the purpose specified.

2. The combination with an automobile clutch controller including the usual pedals of an automobile transmission and a link plate, the latter provided with a pin, of a connecting clevis having one end pivotally connected with a brake pedal for movement therewith and further having means adjacent the other end for temporary engagement with the pin on the link plate whereby said parts will move in unison, said connecting clevis also having a slot in its free end, manually operable means associated with the connecting clevis, and a resilient member carried by said means and projecting into the slot in the connecting clevis whereby the operation of said means will raise or lower the connecting clevis to place it in inoperative or operative condition respectively relative to the pin on the link plate.

3. The combination with an automobile clutch controller including the usual pedals of an automobile transmission and a link plate, the latter provided with a pin, of a connecting clevis having one end pivotally connected with a brake pedal for movement therewith and further having means adjacent the other end for temporary engagement with the pin on the link plate whereby said parts will move in unison, said connecting clevis having a slot in its free end, a bracket attachable to a support adjacent the slotted end of the connecting clevis, said bracket having a pair of spaced notches therein, an operating rod rotatably and slidably mounted in the bracket, a pin on said rod for insertion in either of the bracket notches, a suitable handle on said operating rod, a lever pivoted to the bracket and operatively connected with the operating rod, a resilient arm carried by the lever and projecting into the slot in the connecting clevis whereby the latter may be raised or lowered and held under tension in either position by the operation of the operating rod, and a finger carried by the lever and underlying the resilient arm to engage the latter intermediate its ends when in a raised position.

In testimony whereof, I have hereunto affixed my signature.

OTTO KUGLER, Sr.